United States Patent [19]
Dziemba et al.

[11] Patent Number: 4,732,455
[45] Date of Patent: Mar. 22, 1988

[54] LENS SUPPORT

[75] Inventors: Peter Dziemba, Wisselsheim; Dieter Immerheiser, Bad Nauheim, both of Fed. Rep. of Germany

[73] Assignee: MAP Mikrofilm Apparatebau Dr. Poehler GmbH & Co KG, Ober-Morlen, Fed. Rep. of Germany

[21] Appl. No.: 791,431

[22] Filed: Oct. 25, 1985

[30] Foreign Application Priority Data

Oct. 26, 1984 [DE] Fed. Rep. of Germany ....... 3439254

[51] Int. Cl.4 ............................................. G02B 7/04
[52] U.S. Cl. ................................................ 350/255
[58] Field of Search ....................... 350/255; 353/101; 355/44, 55

[56] References Cited

U.S. PATENT DOCUMENTS 3,634,005  1/1972  Peters et al. ......................... 350/255
3,861,786  1/1975  Badgett .............................. 350/255
4,268,135  5/1981  Lehto ................................. 353/101
4,583,823  4/1986  Walczak ............................. 350/255

FOREIGN PATENT DOCUMENTS 140294  2/1980  European Pat. Off. ............ 350/255
51-7923  1/1976  Japan ................................. 350/255

OTHER PUBLICATIONS

Landsiedel et al., "Constant Focus Image Projection", IBM Tech. Disc. Bull., 12-1970, p. 2100.

Primary Examiner—William H. Punter
Attorney, Agent, or Firm—Wegner & Bretschneider

[57] ABSTRACT

A lens sleeve designed to float in a lens holder. A focussing device with a servomotor and an eccentric fixed directly at the lens sleeve, with said eccentric gripping below a collar of a lens guided in the lens sleeve.

7 Claims, 2 Drawing Figures

ND OF THE INVENTION

This invention relates to lens supports. More particularly, this invention relates to lens supports having a lens sleeve that is designed to float in a lens holder and that is capable of resting on a film holder, the lens support also having a lens capable of sliding axially in the lens sleeve through provision of a focussing device operated by a servomotor. Lens supports of this kind are commonly used in, for instance, microfilm readers and are hence generally known.

Due to the lens sleeve being capable of sliding on the film holder, the distance between the microfilm and the lens remains constant even in the case of relative movement of film holder and lens, provided that the thickness of the upper, transparent plate of the film holder is constant and that the microfilm lies level in the film holder. Practical operation, however, necessitates refocussing when changing films with different emulsion positions. This is particularly true of automatic film change.

With the lens supports known to date, the focussing device driven by the servomotor is fixed at the lens holder or at the unit housing. Since the lens sleeve moves in relation to the lens holder, provision has to be made of movable transmission elements positioned between the lens sleeve and the focussing device, thereby maintaining the capability of providing such relative movement.

These movable transmission elements involve a high degree of design expenditure, bring about undesired play in the focussing device and may be the cause of lens jamming.

SUMMARY OF THE INVENTION

It is a primary object of the present invention to provide a lens support free of the aforementioned and other such disadvantages.

It is another object of the invention to provide a lens support of the kind mentioned at the beginning that features as simple a design as possible and in which the movablility of the lens sleeve supported on the film holder is limited as little as possible by the focussing device.

This object is accomplished according to the invention in that the focussing device is fixed at the lens sleeve.

With a lens support of this kind, the lens sleeve with the focussing device is capable of aligning in relation to the film holder, without the focussing device exerting forces that might impair this alignment. This eliminates the possibility of the lens or the lens sleeve getting jammed. Apart from the above, the lens support of the invention has a very simple design and can hence be manufactured economically.

A preferred embodiment of the invention provides for the servomotor to be fixed at the lens sleeve in radial alignment and for the servomotor to grip below a lens collar via an eccentric driven by it. This embodiment has an especially simple design.

In order to avoid that a tilting moment is exerted on the lens sleeve by the servomotor and its eccentric due to their weight, the lens sleeve may be provided with a counterweight arranged at its side opposite the servomotor. The mass of the small-sized servomotor and of the corresponding counterweight is in this case desired to make for good contact of the lens sleeve on the upper plate and obviates the need for pressure springs that might impair an oscillating motion that is to be kept free from external influences.

To render it possible for the lens to freely align in the lens holder as a function of the course of the upper plate, it is advantageous to provide a bead along the external surface of the lens sleeve, with the bead making contact with the wall of the lens holder at a low degree of play.

In case of lens holders in which a plurality of lenses are arranged it is particularly expedient if the focussing device is supported at the lens sleeve according to the invention, as this obviates the need for refocussing after a lens change. The respective alignment of one lens is maintained in case of lens change, because each lens has its own focussing device.

BRIEF DESCRIPTION OF THE DRAWINGS

The invention will be better understood, and objects other than those set forth above, will become apparent, when consideration is given to the following detailed description thereof. Such description makes reference to the annexed drawings wherein.

DETAILED DESCRIPTION OF THE PREFERRED EMBODIMENTS

Figure 1:
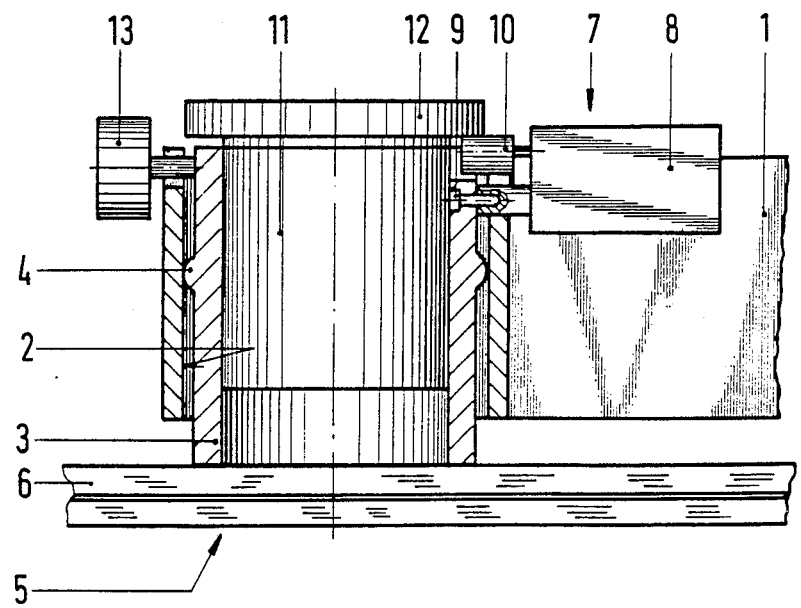
FIG. 1 is a schematic section of a lens support according to the invention.

Referring to the drawing, there will be seen a lens holder 1 supporting a lens sleeve 3 in a bore 2. A bead 4 arranged along the external surface of the lens sleeve 3 makes contact with the wall of the bore 2 at a close tolerance and is therefore capable of performing a reciprocating as well as an oscillating motion in the bore 2.

The lens sleeve 3 is disposed above a film holder 5 having an upper, transparent plate 6, with one face of the lens sleeve 3 being supported, and capable of sliding, on plate 6.

A focussing device 7 has a servomotor 8 of the gear type that is fixed at the lens sleeve 3 in radial alignment by means of screws 9. This servomotor 8 is capable of driving an eccentric 10 supporting a collar 12 of a lens mount 11 guided in the lens sleeve. When the eccentric 10 rotates, the lens mount 11 is pulled out of the lens sleeve 3 to a varying extent, thereby focussing the lens.

A counterweight 13 is fixed at the side of the lens sleeve 3 opposite the servomotor 8. The lens sleeve 3 hence exerts a uniform force on the plate 6 on which it rests.

Figure 2:
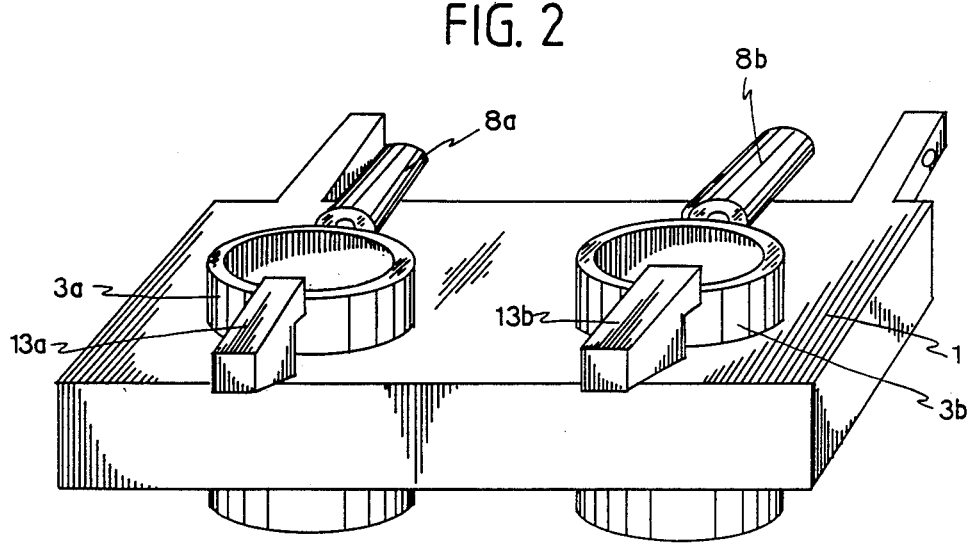
FIG. 2 is a perspective view showing the lens support according to the invention adapted to receive a plurality of lenses.

FIG. 2 shows a lens support according to the invention adapted to receive a plurality of lenses and lens mounts (not shown). In this embodiment, the lens holder 1 has two bores therein in which lens sleeves 3a and 3b are inserted. Each lens sleeve has its own servomotor 8a and 8b, and counterweight 13a and 13b attached thereto. Of course the lens support is not limited to two lens sleeves, but can be designed to support as many lenses as are desired.

It should now be apparent that the objects initially set forth at the outset to this specification have been successfully achieved. Moreover, while there is shown and described present preferred embodiments of the invention, it is to be distinctly understood that the invention is not limited thereto, but may be otherwise variously embodied and practiced within the scope of the following claims.

What is claimed is:

1. A lens support, comprising a lens holder, a lens sleeve adapted to float in the lens holder and to rest on a film holder, a lens mount axially slidably disposed within the lens sleeve, focussing means comprising a servomotor fixed at the lens sleeve, and a counterweight fixed at the lens sleeve at a side of the lens sleeve opposite the servomotor.

2. A lens support according to claim 1, further comprising a bead along the external surface of the lens sleeve, with which the latter rests against the wall of the lens holder at a low degree of play.

3. A lens support according to claim 2, wherein the lens holder is adapted to accommodate a plurality of lens sleeves.

4. A lens support according to claim 1, wherein said lens mount has a collar at the upper end thereof, and the lens support further comprises an eccentric driven by said servomotor gripping the lens mount below said collar, and wherein the servomotor is fixed at the lens sleeve in radial alignment.

5. A lens support according to claim 4, wherein the lens holder is adapted to accommodate a plurality of lens sleeves.

6. A lens support according to claim 4, further comprising a bead along the external surface of the lens sleeve, with which the latter rests against the wall of the lens holder at a low degree of play.

7. A lens support according to claim 6, wherein the lens holder is adapted to accommodate a plurality of lens sleeves.

* * * * *